United States Patent
Miyoshi

(10) Patent No.: US 8,066,371 B2
(45) Date of Patent: Nov. 29, 2011

(54) POLARIZING LENS AND METHOD OF ITS MANUFACTURE

(75) Inventor: Kazuyuki Miyoshi, Sabae (JP)

(73) Assignee: Miyoshi Industrial Enterprise Inc., Sabae-shi (JP)

( * ) Notice: Subject to any disclaimer, the term of this patent is extended or adjusted under 35 U.S.C. 154(b) by 107 days.

(21) Appl. No.: 12/534,875

(22) Filed: Aug. 4, 2009

(65) Prior Publication Data
US 2010/0033675 A1   Feb. 11, 2010

(30) Foreign Application Priority Data

Aug. 5, 2008   (JP) .................. 2008-202306

(51) Int. Cl.
*G02C 7/02* (2006.01)
*B29D 11/00* (2006.01)
*G02C 7/10* (2006.01)

(52) U.S. Cl. .......... 351/177; 351/163; 264/1.32

(58) Field of Classification Search .......... 351/163, 351/177; 359/642; 264/1.1, 1.32
See application file for complete search history.

(56) References Cited

U.S. PATENT DOCUMENTS

| | | | | |
|---|---|---|---|---|
| 5,042,935 A | * | 8/1991 | Logan et al. | 351/159 |
| 5,047,272 A | * | 9/1991 | Hassel et al. | 428/40.4 |
| 6,177,032 B1 | * | 1/2001 | Smith et al. | 264/1.34 |
| 2004/0096666 A1 | * | 5/2004 | Knox et al. | 428/412 |

* cited by examiner

Primary Examiner — James Greece
(74) Attorney, Agent, or Firm — Judge Patent Associates

(57) ABSTRACT

High productivity polarizing lens that is impact-resistant, and is not prone to warping or iridescent patterning and other color irregularities. Polarizing lens (1) includes a polarizing sheet (2) in which a pair of protective films (11) and (12) is laminated on both sides of a polarizing film (10), and a lens base material layer (3) integrally bonded on a rear side of the polarizing sheet (2), the lens base material layer (3) being composed of polyurethane. Manufacturable by: bending the polarizing sheet (2) at a predetermined curvature; fitting the polarizing sheet (2) in a mold recessed with a cavity contoured to correspond to the bent polarizing sheet so that its front side runs along the cavity; and filling and injection-molding thermoplastic polyurethane into the mold in which the polarizing sheet (2) has been fit, to form the lens base material layer (3) on the polarizing sheet (2) rear side.

2 Claims, 5 Drawing Sheets

POLARIZING LENS AND METHOD OF ITS MANUFACTURE

BACKGROUND OF THE INVENTION

1. Technical Field

This invention relates to a polarizing lens and method of its manufacture.

2. Background Art

With the recent increase in popularity of outdoor activities such as outdoor sports and recreation, sunglasses have been increasingly used worldwide to protect the eyes from sunlight. Sunglasses have polarizing lenses, which are roughly classified into those of plastic and glass. Generally, plastic polarizing lenses tend to be more commonly used because they are lighter in weight, easier to handle, and higher in safety than glass polarizing lenses.

Plastic polarizing lenses employ such a structure that a polarizing film consisting of polyvinyl alcohol or the like is interposed between plastic resins. Typical examples include polarizing lenses produced from CR-39 by cast type molding.

However, polarizing lenses consisting of CR-39 are problematic in that they are not sufficiently impact-resistant and thus are subject to cracking. Additionally, the cast type molding, although a suitable production method of thermosetting resins such as CR-39, requires a long period of time to polymerize and cure the resin inside the mold, which necessitates a large number of molds of a single standard. This posed the problem of poor productivity.

Meanwhile, such polarizing lenses are known that polycarbonate is laminated by injection molding on the rear side of a polarizing film (e.g., Japanese patent publication Hei08-52817). These polarizing lenses have increased strength and superior impact resistance, and additionally, compared with cast type molding, the takt time (cycle time) is significantly shorter and they can be made with only a small number of molds to prepare; thus productivity can be improved.

However, it has become evident that polarizing lenses consisting of injection-molded polycarbonate are subject to iridescent patterns such as color shading and distortion, falling short of the optical properties required of polarizing lenses. Inherently, polarizing lenses allow passing of light waves oscillating in particular directions through the lenses on the basis of the properties of the polarizing films, but the light waves are made to rotate or bend by the birefringence of the polycarbonate, which is believed to be a main factor of iridescent patterns such as color shading and distortion.

Polycarbonate has a high stress-optic coefficient and thus birefringence easily occurs upon application of a small level of stress. It is therefore inevitable that birefringence is formed in injection-molded polycarbonate due to fluid residual stress or thermal stress involved in the injection filling and cooling steps.

However, the iridescent patterns such as color shading and distortion that occur on the polarizing lenses are not preferred because they can adversely affect the eyesight and the field of vision.

BRIEF SUMMARY OF THE INVENTION

The present invention has been made in view of the above-described problems, and it is an object of the present invention to provide a polarizing lens that excels in impact resistance and productivity, and additionally, that hardly encounters iridescent patterns such as color shading and distortion, and to provide a method of manufacturing the polarizing lens.

To solve above problem this polarizing lens adopt a polarizing sheet in which a polarizing film is interposed between a couple of protective films; and a lens base material layer integrally bonded on a rear side of the polarizing sheet; wherein the lens base material layer consists of thermoplastic polyurethane.

The polarizing lens have a couple of protective films consists of polycarbonate and at least one of the films is extended.

The polarizing lens have a polished surface is formed on the lens base material layer to have an optical corrective power.

A method of manufacturing a polarizing lens, is the steps of:

bending a polarizing sheet in which a polarizing film is interposed between a couple of protective films at a specific curvature;

placing the polarizing sheet on a mold recessed a cavity with a shape corresponding to the bended polarizing sheet, with being a front side of the polarizing sheet along the cavity; and forming a lens base material layer on a rear side of the polarizing sheet by filling thermoplastic polyurethane into the mold in which the polarizing sheet is placed and followed by injection molding; wherein the polarizing sheet and thermoplastic polyurethane forming the lens base material layer are fusion bonded over a boundary surface.

The method of manufacturing a polarizing lens is the condition of the injection molding is that a temperature of thermoplastic polyurethane resin is from 180° C. to 250° C. and the a temperature of the molding is from 50° C. to 100° C.

EFFECTS OF THE INVENTION

With the polarizing lens according to the present invention, a lens base material layer consisting of thermoplastic polyurethane is integrally bonded on the rear side of a polarizing sheet in which a pair of protective films is laminated on both sides of a polarizing film. This configuration makes the polarizing lens not only excel in impact resistance but also hardly encounter iridescent patterns such as color shading and distortion. Additionally, with the method of manufacturing the polarizing lens according to the present invention, the lens base material layer can be easily formed integrally on the rear side of the polarizing sheet by injection molding, resulting in significantly high productivity.

DETAILED DESCRIPTION OF THE INVENTION

Embodiments of the present invention will be described with reference to FIG. 1, which is a cross-sectional view of a polarizing lens 1 according to an embodiment.

Figure 1:
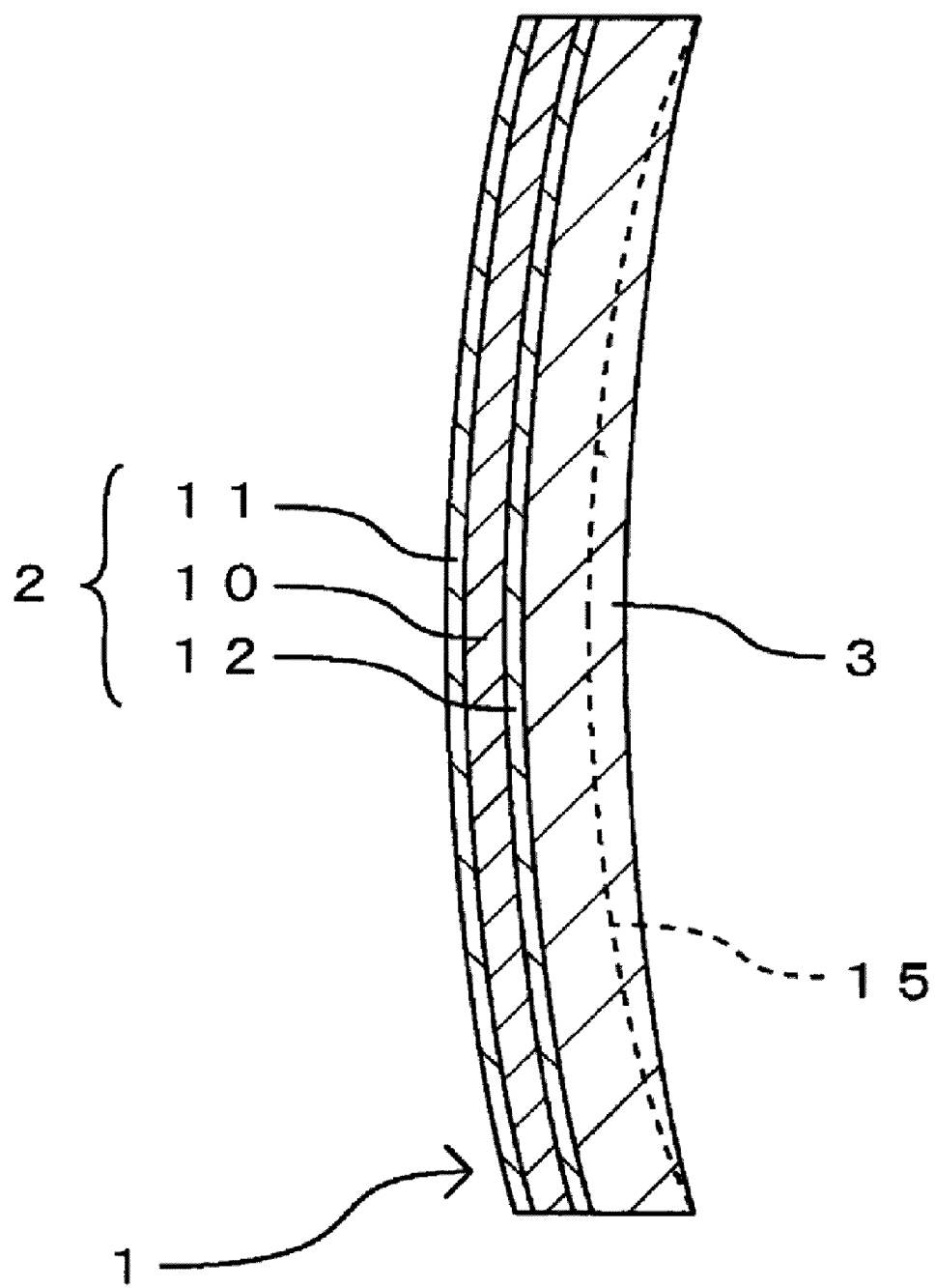
FIG. 1 is a cross sectional view for explaining a polarized lens of the example.

Referring to FIG. 1, the polarizing lens 1, as a whole, has an arc cross section that is gently curved to be convex frontward. The polarizing lens 1 is configured of an integral lamination of a thin polarizing sheet 2 and a thick lens base material layer 3, with the structure that the lens base material layer 3 is solidly bonded on the rear side of the polarizing sheet 2.

The polarizing sheet 2 includes a polarizing film 10 and a pair of protective films 11 and 12 laminated and bonded on the front and rear sides of the polarizing film 10. The polarizing film 10 is formed by uniaxially drawing hydroxyl resin such as polyvinyl alcohol resin and impregnating the resin with a polarizer such as an iodine compound and a dichroic dye. The material of the polarizing film 10 may be polyester polyol resin or the like.

The polarizing film 10 is brittle and poor in humidity resistance and thus needs protection. In view of this, the polarizing lens 1 has the protective films 11 and 12 constitute the polarizing sheet 2. Examples of the resin material of the protective films 11 and 12 include polycarbonate, polyamide, polyester, and polystyrene, among which polycarbonate is most preferred for its high heat resistance, water resistance, and impact resistance, and excellent transparency. The polarizing sheet 2 can be heated to high temperature in the course of formation of the polarizing lens 1 and thus preferably has some level of heat resistance.

The protective films 11 and 12 may be produced from, for example, polycarbonate resin or polycarbonate-based copolymer by casting or extrusion molding. At least one of the protective films 11 and 12 is preferably subjected to drawing. This alleviates the internal stress and maintains a satisfactory field of vision of the polarizing lens 1.

The total thickness of the polarizing sheet 2 is set at 300 to 800 μm. A thickness of less than 300 μm may result in deficiencies in the degree of polarization and strength. A thickness in excess of 800 μm is not preferable in that the polarizing sheet 2 may become difficult to bend and that the molding thickness of the lens base material layer 3 may be restricted.

The thickness of each of the protective films 11 and 12 is preferably in the range of 200 to 500 μm. A thickness of less than 200 μm may make the adhering work with the polarizing film 10 difficult. A thickness in excess of 500 μm may lead to thickening of the polarizing sheet 2, which is not preferable.

If the protective film 12, which comes into contact with the lens base material layer 3, is excessively thin, the protective film 12 or the polarizing sheet 2 may be broken by heat, pressure, or the like involved in molding of the lens base material layer 3. In view of this, the thickness of the protective film 12, in particular, is preferably 200 μm or more.

Examples of the adhesive to adhere the polarizing film 10 and the protective films 11 and 12 to each other include acrylic adhesive, urethane adhesive, and epoxy adhesive. The adhesive is preferably excellent in transparency, not easily tarnished, and has heat resistance.

The lens base material layer 3 consists of thermoplastic polyurethane. As the thermoplastic polyurethane, polyester polyurethane or polyether polyurethane is suitably used. More specifically, aliphatic urethane is preferred for its excellent yellowing resistance and resistance against hydrolysis.

The thermoplastic polyurethane preferably has a Shore hardness of 50 D or more as measured according to ISO 868. A Shore hardness of less than 50 D makes it difficult to form a mirror on the rear side of the lens base material layer 3 by grinding, polishing, and the like.

The thermoplastic polyurethane preferably has a Vicat softening temperature of 100° C. or higher, more preferably 110° C. or higher. If the Vicat softening temperature is lower than 100° C., the thermoplastic polyurethane may be deformed when the polarizing lens 1 is left at a place where the temperature can be high, such as in a dashboard. A Vicat softening temperature of 100° C. or higher facilitates post-processing after the molding, such as hard coating and annealing.

The thickness of the lens base material layer 3 is set at 2 to 15 mm. If the thickness is less than 2 mm, the lens base material layer 3 may lack in strength. A thickness in excess of 15 mm is not preferable in that the lens base material layer 3 excessively increases in weight and thus becomes inconvenient to handle.

The polarizing lens 1 may not only be used as a plain lens but also as a prescription lens for correcting vision. Specifically, a prescription lens for correcting vision can be obtained by polishing the inner side (rear side) of the lens base material layer 3 of the polarizing lens 1 to form a polished surface 15, as indicated by a dotted line in FIG. 1. Since the lens base material layer 3 of the polarizing lens 1 consists of thermoplastic polyurethane, such processing can be easily carried out.

The thickness of the lens base material layer 3 and the form of the polished surface 15 are adjusted according to the desired optical power. The thus-obtained prescription lens for correcting vision may be used, for example, in the form of being directly put on a frame of glasses.

It will be readily understood that the polarizing lens 1 finds applications in a wide range of optical products such as clip-on sunglasses and goggles, in addition to usual sunglasses.

Next, an exemplary method of manufacturing the polarizing lens 1 will be described.

First, the polarizing sheet 2 is formed by adhering the protective films 11 and 12 to both sides of the polarizing film 10, and then bent according to the curvature of the polarizing lens 1 being manufactured. The bending may be carried out by a known method such as vacuum molding, pressure molding, and press-molding.

The bent polarizing sheet 2 is placed on a mold. The mold usually consists of glass with a recessed cavity forming a curved face that corresponds to the shape of the bent polarizing sheet 2. The polarizing sheet 2 is placed on the mold so that the convex side (front side) of the polarizing sheet 2 thoroughly comes into contact with the bottom side of the cavity. The polarizing sheet 2 may be temporarily fixed to the mold with an adhesive or the like, thus stabilizing the polarizing sheet 2.

The lens base material layer 3 is formed by filling thermoplastic polyurethane into the mold and by injection molding. This involves a fusion and uniform integration of the boundary between the protective film 12 of the polarizing sheet 2 placed on the mold and the thermoplastic polyurethane forming the lens base material layer 3. Thus, the lens base material layer 3 is solidly bonded on the concave side (rear side) of the polarizing sheet 2.

The polarizing sheet 2 and the thermoplastic polyurethane may be compression-bonded on one another while the thermoplastic polyurethane is in a heat accumulative adhesion state. This more reliably prevents containment of air bubbles between the polarizing sheet 2 and the lens base material layer 3.

(d) After cooling the product and taking it out of the mode, the polarizing lens 1 is obtained. As necessary, finishing such as burring and washing may be carried out.

The thermoplastic polyurethane forming the lens base material layer 3 excels in fusibility and thus facilitates the integration of the polarizing sheet 2 and the lens base material layer 3 simultaneously with the injection molding. This eliminates the need for providing an adhesive between the polarizing sheet 2 and the lens base material layer 3. Additionally, the takt time is short (1 to 10 minutes) and the number of molds to prepare can be minimized, resulting in significantly satisfactory productivity.

As necessary, the protective film 12 may be subjected to primer processing or plasma processing, in order to improve the adhesive strength between the polarizing sheet 2 and the lens base material layer 3.

As conditions for the injection molding, the resin temperature of the thermoplastic polyurethane is preferably set at 180 to 250° C., and the mold temperature is preferably set at 50 to 100° C. Even though these ranges are lower than those in the conventional cast type molding and injection molding of polycarbonate resin and the like, the polarizing lens 1 manufactured within these ranges has satisfactory optical properties.

EMBODIMENT 1

On both sides of a 50 μm-thick polarizing film consisting of polyvinyl alcohol impregnated with a polarizer, protective films each having a thickness of 300 μm and consisting of uniaxially drawn polycarbonate were laminated and bonded, thus forming a polarizing sheet. This polarizing sheet was bent by vacuum molding using an aluminum curvature mold (curvature: 100R, outer circumference: 70ϕ).

Next, the bent polarizing sheet was placed on a glass mold, and thermoplastic polyurethane (polyether polyurethane resin) having a glass transition temperature of −10° C. was poured on the rear side of the polarizing sheet and integrated therewith by injection molding, thus forming a lens base material layer of 2.2 mm thick. The resin temperature of the thermoplastic polyurethane was 200° C. and the mold temperature was 60° C. The product was taken out of the mold after being cooled for 100 seconds, thus obtaining a polarizing lens according to embodiment 1.

COMPARATIVE EXAMPLE 1

Similarly the lens base material layer with a thickness of 2.2 mm was formed by using the polarizing sheet with the same structure as in Embodiment 1 and the mold in a manner such that polycarbonate of 18,000 molecular weight was filled on the rear side of the polarizing sheet and then bonded integrally by the injection molding. Under these circumstances the temperature of polycarbonate resin was 270° C. and the temperature of the mold was 70° C. The polarizing lens in Comparative Example 1 was formed by die drawing after being cooled for 120 seconds.

Figure 2A:
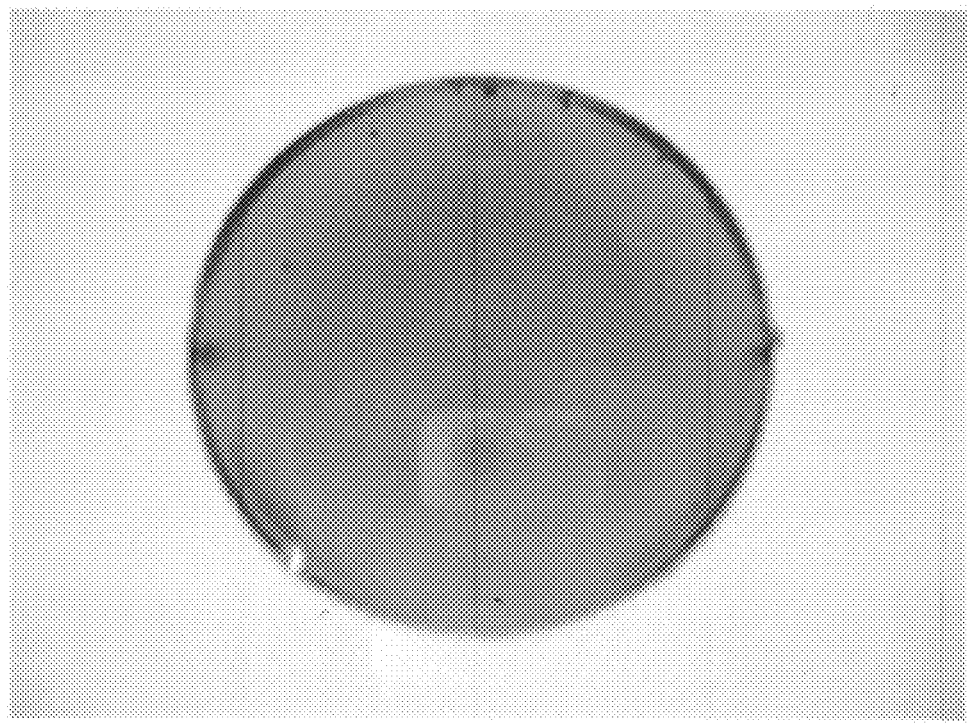
FIG. 2A is a view for explaining a polarized lens of Embodiment 1.
Figure 2B:
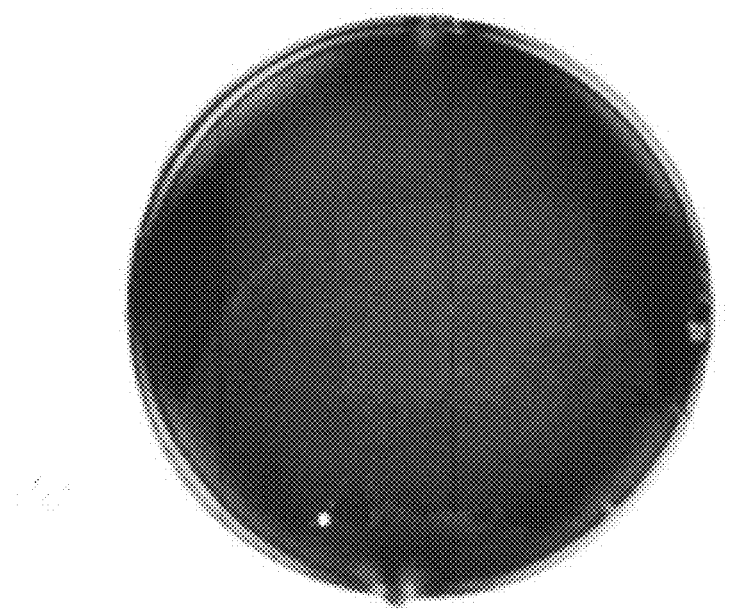
FIG. 2B is a view for explaining a polarized lens of Embodiment 1.
Figure 3A:
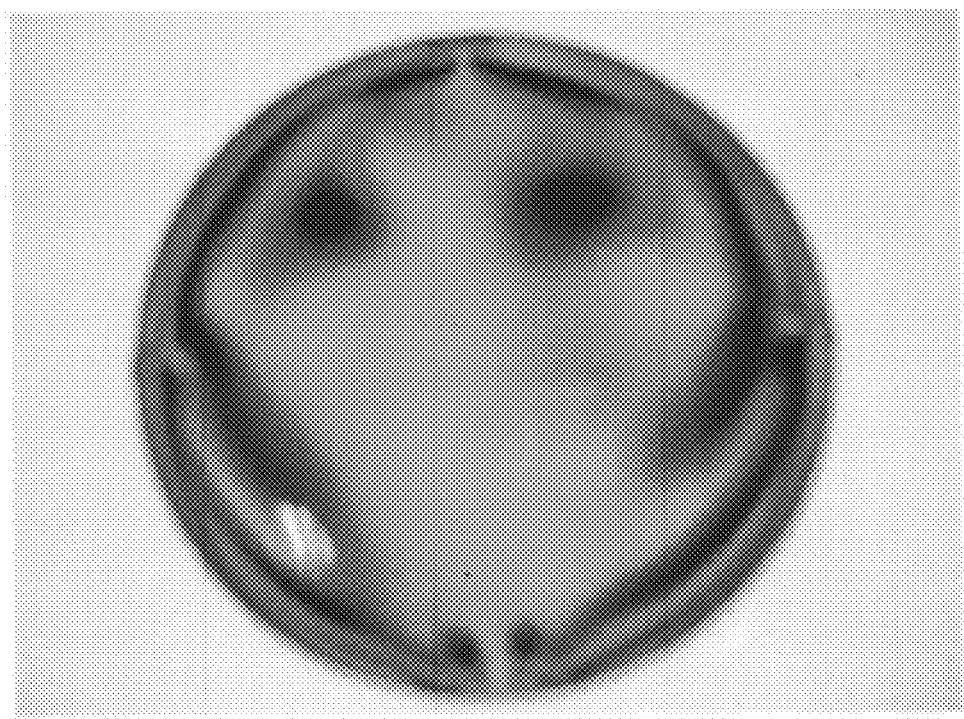
FIG. 3A is a view for explaining a polarized lens of Comparative Example 1.
Figure 3B:
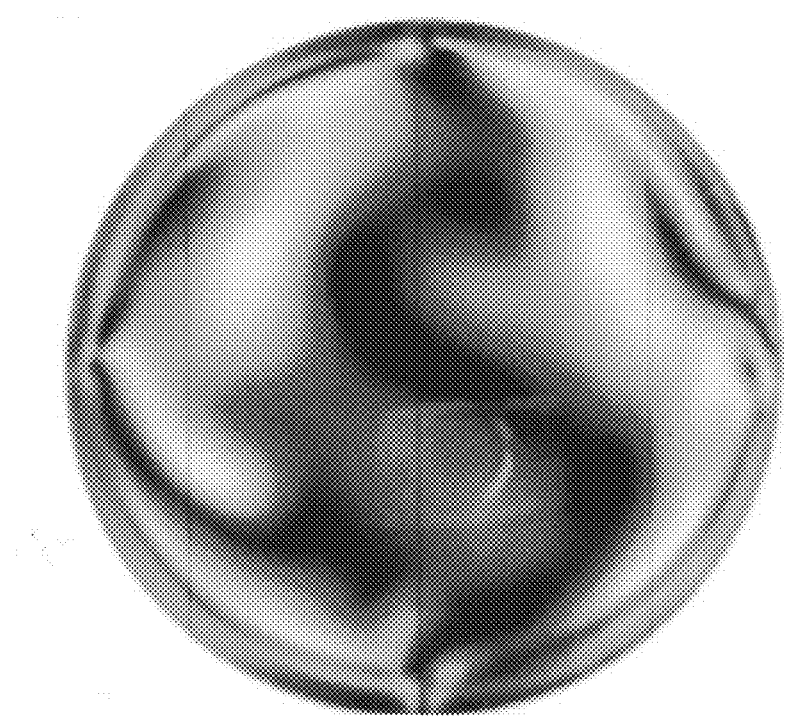
FIG. 3B is a view for explaining a polarized lens of Comparative Example 1.

The performance of the polarizing lens was compared by placing each of the polarizing lenses obtained in Embodiment 1 and Comparative Example 1 on the polarizing plate with polarizing nature and has being irradiated by a light from a light source at the rear side of the polarizing plate. The results are shown in FIG. 2A, FIG. 2B, FIG. 3A, and FIG. 3B. FIG. 2A and FIG. 2B illustrate the polarizing lens in Embodiment 1; FIG. 2A is for a case of placing the polarizing lens and the polarizing axis of the polarizing plate in parallel to each other; FIG. 2B is for a case of placing the polarizing lens and the polarizing axis of the polarizing plate in perpendicular to each other. FIG. 3A and FIG. 3B illustrate the polarizing lens in Comparative Example 1; FIG. 3A is for a case of placing the polarizing lens and the polarizing axis of the polarizing plate in parallel to each other; FIG. 3B is for a case of placing the polarizing lens and the polarizing axis of the polarizing plate in perpendicular to each other. It is clear from these results that for the polarizing lens in Comparative Example 1 the iridescent pattern such as color shading and distortion were generated, whereas for the polarizing lens in Embodiment 1 the iridescent pattern such as color shading and distortion were not observed.

Figure 4:
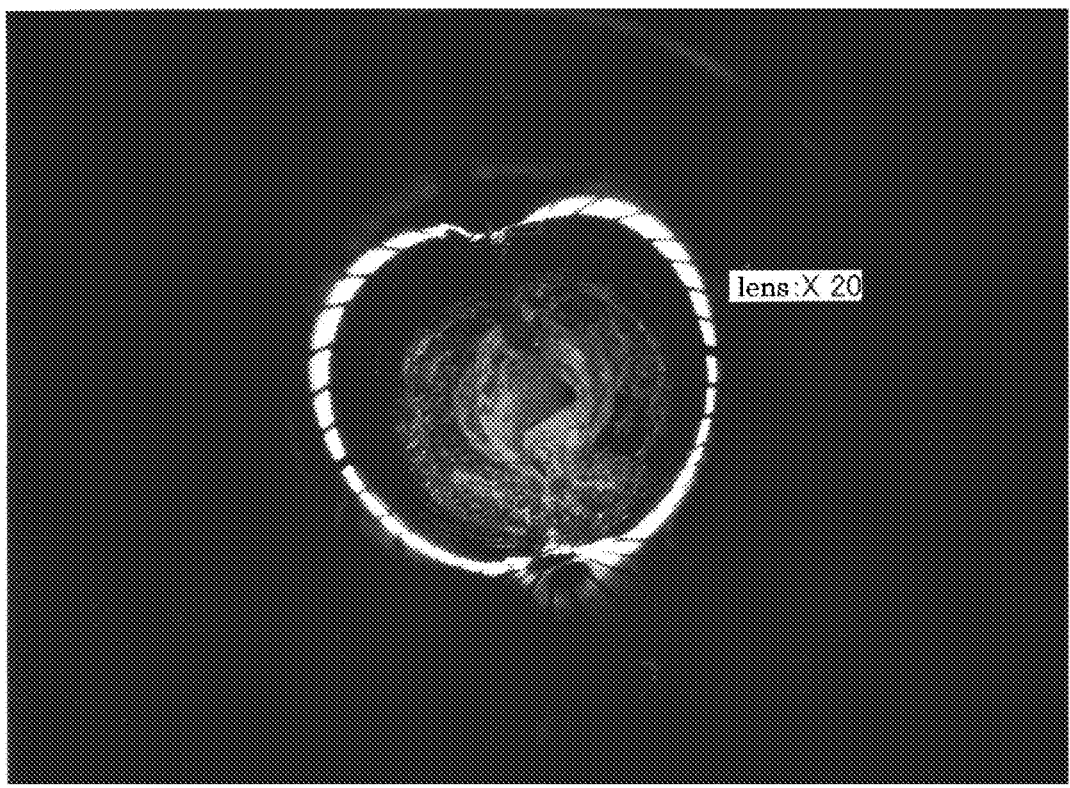
FIG. 4 is a view for explaining a polarized lens of Embodiment 1.
Figure 5:
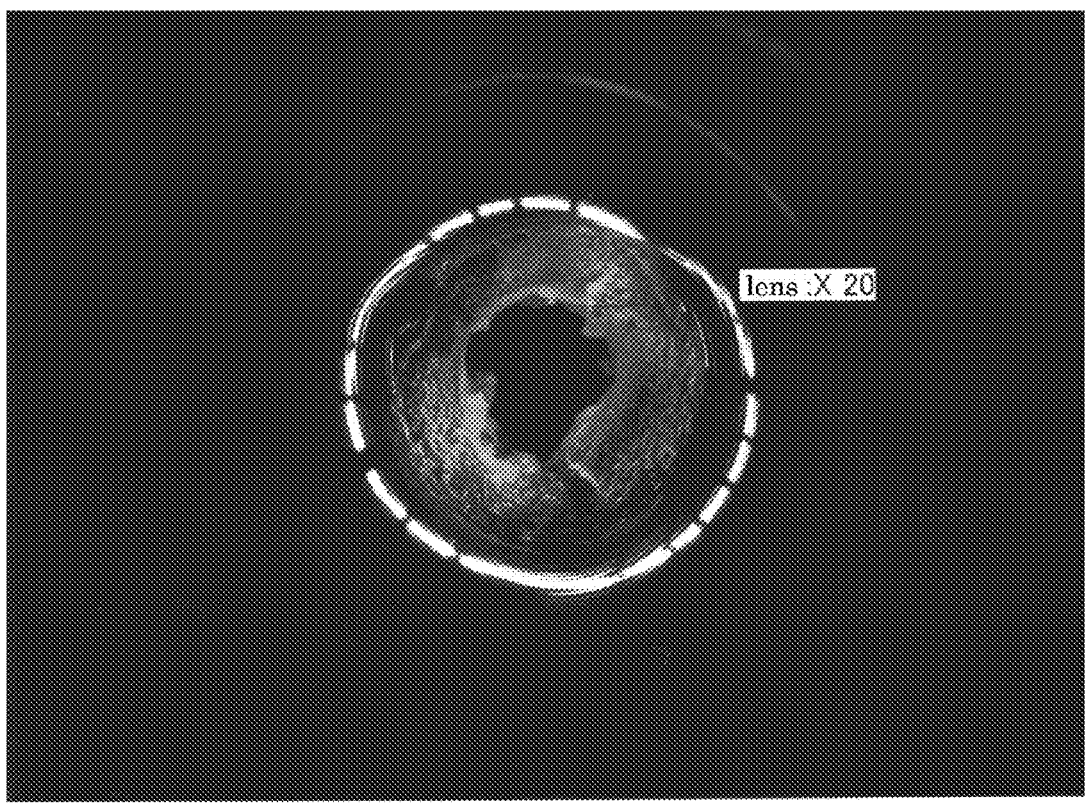
FIG. 5 is a view for explaining a polarized lens of Comparative Example 1.

Further the impact resistance test was performed for the polarizing lenses obtained in Embodiment 1 and Comparative Example 1 by pressing the chisel (1 kg in weight) having a pointed end against the front side of each lens with a predetermined force in vertical direction. FIG. 4 and FIG. 5 show the results. FIG. 4 illustrates the polarizing lens in Embodiment 1, whereas FIG. 5 illustrates the polarizing lens in Comparative Example 1.

As shown in these figures, for the polarizing lenses in Embodiment 1 and Comparative Example 1, although the chisel pierced though each lens without causing any cracking, but the size of the pierced hole for the polarizing lens in Embodiment 1 was smaller than that for the polarizing lens in Comparative Example 1, showing a greater ability in impact resistance for the polarizing lens in Embodiment 1.

INDUSTRIAL APPLICABILITY

The present invention provides a polarizing lens that excels in impact resistance and productivity, and additionally, that hardly encounters iridescent patterns such as color shading and distortion, and a method of manufacturing the polarizing lens. Thus, the present invention has industrial applicability.

What is claimed is:

1. A method of manufacturing a polarizing lens, comprising the steps of:
  forming a polarizing film by drawing a hydroxyl resin and impregnating it with a polarizer;
  laminating directly onto a front side of the polarizing film a first protective film of a drawn polycarbonate-based copolymer, and laminating directly onto a rear side of the polarizing film a second protective film of a drawn polycarbonate-based copolymer;
  bending, at a predetermined curvature, the polarizing laminate;
  fitting the bending-processed polarizing laminate in a mold recessed with a cavity contoured to correspond to the polarizing laminate, so that the polarizing-laminate front side runs along the cavity;
  filling an injection-molding thermoplastic polyurethane into the mold in which the polarizing laminate has been fit, to form a lens base material layer on the polarizing laminate rear side; and
  fusion-bonding the polarizing laminate and the lens base material layer at their boundary surfaces to unitize them.

2. The method of manufacturing a polarizing lens according to claim 1, wherein conditions during the injection molding are that the temperature of thermoplastic polyurethane resin is from 180° C. to 250° C., and the temperature of the mold is from 50° C. to 100° C.

* * * * *